United States Patent
Sleiman et al.

(10) Patent No.: US 11,506,340 B1
(45) Date of Patent: Nov. 22, 2022

(54) HYDROGEN FUELING STATION PRIORITY PANEL WITH COOLING

(71) Applicant: FirstElement Fuel, Inc., Newport Beach, CA (US)

(72) Inventors: Ghassan Sleiman, Torrance, CA (US); Andrew Youlio, Simi Valley, CA (US); Max Eman, Mission Viejo, CA (US)

(73) Assignee: FirstElement Fuel, Inc., Newport Beach, CA (US)

( * ) Notice: Subject to any disclaimer, the term of this patent is extended or adjusted under 35 U.S.C. 154(b) by 0 days.

(21) Appl. No.: 17/660,388

(22) Filed: Apr. 22, 2022

Related U.S. Application Data

(60) Provisional application No. 63/223,512, filed on Jul. 19, 2021.

(51) Int. Cl.
*F17C 13/02* (2006.01)
*F17C 5/00* (2006.01)
*F17C 13/04* (2006.01)

(52) U.S. Cl.
CPC ............ *F17C 5/007* (2013.01); *F17C 13/026* (2013.01); *F17C 13/04* (2013.01); *F17C 2205/0335* (2013.01); *F17C 2221/012* (2013.01); *F17C 2223/0153* (2013.01)

(58) Field of Classification Search
CPC ........ F17C 5/007; F17C 13/026; F17C 13/04; F17C 2205/033; F17C 2221/012; F17C 2223/015

See application file for complete search history.

(56) References Cited

U.S. PATENT DOCUMENTS

| | | | |
|---|---|---|---|
| 7,360,563 B2* | 4/2008 | Mitlitsky | F17C 13/026 141/2 |
| 2007/0257043 A1* | 11/2007 | Kanoya | F17C 13/026 141/82 |
| 2012/0104036 A1* | 5/2012 | Farese | F17C 5/007 222/3 |
| 2013/0008558 A1 | 1/2013 | Cajiga et al. | |
| 2014/0263420 A1 | 9/2014 | Lambrix et al. | |
| 2014/0364999 A1 | 12/2014 | Kennett et al. | |
| 2016/0116113 A1 | 4/2016 | Mrowzinski | |
| 2017/0023180 A1 | 1/2017 | Petit et al. | |
| 2017/0102110 A1 | 4/2017 | Lomax et al. | |
| 2018/0038550 A1* | 2/2018 | Kondo | F17C 5/06 |
| 2018/0073679 A1 | 3/2018 | Roberge et al. | |
| 2018/0292050 A1 | 10/2018 | Thiessen | |
| 2019/0178447 A1 | 6/2019 | Poorman et al. | |
| 2021/0010642 A1 | 1/2021 | Kubista et al. | |

FOREIGN PATENT DOCUMENTS

RU  2711890 C1  1/2020

* cited by examiner

*Primary Examiner* — Jason K Niesz
(74) *Attorney, Agent, or Firm* — Knobbe Martens Olson & Bear, LLP

(57) ABSTRACT

A flow control panel configured to control the flow of fuel from a storage bank to a dispense includes a cold fuel controller, a dispenser port, and a processor. The cold fuel controller is configured to control the flow of cold fuel from a cold fuel line. The dispenser port is in fluid communication with the cold fuel controller. The processor is configured to receive an indication of fuel temperature within a dispenser and activate the cold fuel controller to allow the cold fuel from the cold fuel line to flow to the dispenser port when the indication of fuel temperature within the dispenser exceeds a maximum temperature determined by the dispenser.

27 Claims, 7 Drawing Sheets

FIG. 3

HYDROGEN FUELING STATION PRIORITY PANEL WITH COOLING

PRIORITY

This application claims the benefit of priority from U.S. Provisional No. 63/223,512, filed Jul. 19, 2021, which is incorporated by reference herein in its entirety.

BACKGROUND

Field

This disclosure relates to the control of the flow of hydrogen fuel from hydrogen gas storage banks to hydrogen gas dispensers for vehicle fueling.

Description of the Related Art

Gaseous hydrogen has become a desirable fuel source due to its abundance and cleanliness, as there are many concerns that arise from petroleum fuel-based transportation technologies, including: effect on climate change, air pollution, and energy security. To address such concerns, alternatives to gasoline and diesel-powered vehicles are becoming more desirable. Hydrogen powered fuel cell vehicles offer one solution, as such fuel may be generated and consumed with little to no carbon footprint, pollutant emissions, or petroleum consumption. Vehicle fueling stations that supply gaseous hydrogen need to address technical issues not associated with traditional liquid fuels. For example, a hydrogen fueling station fuel dispenser must determine a vehicle's storage tank's capacity, and the pressure and temperature within the vehicle's storage tank prior to and during fueling. If the pressure of the hydrogen gas source does not exceed the desired filling pressure, the fueling station will be unable to fuel the vehicle. In addition, fueling inefficiency can result when multiple hydrogen gas sources (e.g., gas storage banks) are available, each source storing hydrogen gas at a different pressure. The inefficiency is further amplified when multiple vehicles are simultaneously fueled at multiple dispensers.

A system and method to efficiently draw fuel from a selected hydrogen gas source and to simultaneously match hydrogen gas dispensers to hydrogen gas storage sources would address such problems.

SUMMARY

In some aspects, the techniques described herein relate to a flow control panel configured to control the flow of fuel from a storage bank to a dispenser, including: a cold fuel controller configured to control the flow of cold fuel from a cold fuel line; a dispenser port in fluid communication with the cold fuel controller; and a processor, wherein the processor is configured to receive an indication of fuel temperature within a dispenser and activate the cold fuel controller to allow the cold fuel from the cold fuel line to flow to the dispenser port when the indication of fuel temperature within the dispenser exceeds a maximum temperature determined by the dispenser.

In some aspects, the techniques described herein relate to a flow control panel, further including: an output port coupled to the storage bank; a flow controller coupled to the output port and configured to control the flow of fuel from the storage bank to the output port; and a junction coupled to the cold fuel controller and the output port, wherein the processor is further configured to activate the flow controller to allow the fuel from the storage bank to flow to the junction and mix with the cold fuel from the cold fuel controller at the junction to create a fuel mixture, and to maintain the fuel mixture at a temperature that is below the maximum fuel temperature determined by the dispenser.

In some aspects, the techniques described herein relate to a flow control panel, further including a check valve located between the cold fuel controller and the junction.

In some aspects, the techniques described herein relate to a flow control panel, further including a check valve located between the output port and the storage bank.

In some aspects, the techniques described herein relate to a flow control panel, wherein the dispenser port is configured to couple the flow controller to the dispenser.

In some aspects, the techniques described herein relate to a flow control panel, wherein the cold fuel line is configured to receive cold hydrogen fuel from a liquid pump.

In some aspects, the techniques described herein relate to a flow control panel, wherein the temperature of hydrogen fuel flowing to the dispenser port has a temperature between $-40$ and $-17.5°$ C.

In some aspects, the techniques described herein relate to a flow control panel, wherein the output port is coupled to a plurality of input ports, and each input port is coupled to a different storage bank of a plurality of storage banks.

In some aspects, the techniques described herein relate to a flow control panel, wherein the plurality of input ports includes 8 input ports, and the plurality of storage banks includes 8 storage banks.

In some aspects, the techniques described herein relate to a flow control panel, wherein each input port is coupled to a respective storage bank flow controller configured to control a flow of hydrogen gas from one of the plurality of storage banks to the respective input port.

In some aspects, the techniques described herein relate to a flow control panel configured to control the flow of fuel from a storage bank to a dispenser, including: a cold fuel controller configured to control the flow of cold fuel from a cold fuel line; a dispenser port in fluid communication with the cold fuel controller; and a processor, wherein the processor is configured to receive an indication of the temperature of a cooling fluid coupled to the cold fuel line and activate the cold fuel controller to allow the cold fuel from the cold fuel line to flow to the dispenser port when the indication of the temperature of the cooling fluid exceeds a threshold temperature value.

In some aspects, the techniques described herein relate to a flow control panel, further including: an output port coupled to the storage bank; a flow controller coupled to the output port and configured to control the flow of fuel from the storage bank to the output port; and a junction coupled to the cold fuel controller and the output port, wherein the processor is further configured to activate the flow controller to allow the fuel from the storage bank to flow to the junction and mix with the cold fuel from the cold fuel controller at the junction to create a fuel mixture, and to maintain the fuel mixture at a temperature that is below the maximum fuel temperature determined by the dispenser.

In some aspects, the techniques described herein relate to a flow control panel, further including a check valve located between the cold fuel controller and the junction.

In some aspects, the techniques described herein relate to a flow control panel, further including a check valve located between the output port and the storage bank.

In some aspects, the techniques described herein relate to a flow control panel, further including an output connection coupled to an output of the junction, wherein the output connection is configured to couple to the dispenser.

In some aspects, the techniques described herein relate to a flow control panel, wherein the cold fuel line is configured to receive cold hydrogen fuel from a liquid pump.

In some aspects, the techniques described herein relate to a flow control panel, wherein the temperature of hydrogen fuel flowing to the dispenser port has a temperature between −40 and −17.5° C.

In some aspects, the techniques described herein relate to a flow control panel, wherein the output port is coupled to a plurality of input ports, and each input port is coupled to a different storage bank of a plurality of storage banks.

In some aspects, the techniques described herein relate to a flow control panel, wherein the plurality of input ports includes 8 input ports, and the plurality of storage banks includes 8 storage banks.

In some aspects, the techniques described herein relate to a flow control panel, wherein each input port is coupled to a flow controller configured to control a flow of hydrogen gas from one of the plurality of storage banks to the input port.

In some aspects, the techniques described herein relate to a flow control panel configured to control the flow of fuel from a storage bank to a dispenser, including: a plurality of input flow controllers configured to control the flow of stored fuel from a plurality of storage bank to a plurality of input ports; the plurality of input ports, each input port coupled to a plurality of output ports; the output ports, each output port coupled to a respective dispenser port, wherein each dispenser port is configured to be coupled to a dispenser; a plurality of output flow controllers, each output flow controller coupled to a respective input port and a respective output port, and configured to enable the flow of fuel from the input port and the output port; a processor, configured to control the input flow controllers and the output flow controllers, the processor coupled to a memory; and the memory, storing instructions that when executed by the processor cause the processor to: receive a desired fuel pressure value from a dispenser; receive indications of fuel pressures within each of the storage banks; select a desired storage bank having the lowest fuel pressure among the storage banks that have fuel pressures greater than the desired fuel pressure; and activate a desired input port and a desired output port to enable fluid flow from the desired storage bank to the dispenser.

In some aspects, the techniques described herein relate to a flow control panel, wherein the instructions further cause the processor to: monitor the fuel pressure in the desired storage bank; determine that the fuel pressure in the desired storage bank has dropped below the desired fuel pressure; select a new desired storage bank having the lowest fuel pressure among the storage banks that is greater than the desired fuel pressure; and activate a new desired input port to enable fluid to flow from the new desired storage bank to the dispenser.

In some aspects, the techniques described herein relate to a flow control panel, wherein the instructions further cause the processor to select the desired storage bank having the lowest fuel pressure among the storage banks that is greater than the desired fuel pressure plus a threshold amount.

In some aspects, the techniques described herein relate to a flow panel, wherein the threshold amount is selected from the group consisting of: 10, 25, 50, 75, and 100 bar In some aspects, the techniques described herein relate to a flow panel, wherein the threshold amount is selected by a user.

In some aspects, the techniques described herein relate to a flow panel, further including a check valve located between each output flow controller and a respective output port.

In some aspects, the techniques described herein relate to a flow panel, further including a storage bank input port coupled to an input fuel line and a plurality of storage bank flow controllers, each storage bank flow controller coupled to a respective input port.

In some aspects, the techniques described herein relate to a flow panel, wherein the instructions further cause the processor to determine a desired storage bank for filling and activate a desired storage bank flow controller and the input flow controller coupled to the input port that is coupled to the desired storage bank flow controller to enable fuel to flow from the input fuel line to the desired storage bank.

In some aspects, the techniques described herein relate to a flow panel, further including a check valve located between each of the storage bank flow controllers and a respective input port, the check valve configured to enable flow of fuel from the storage bank flow controller to the input port and to prevent flow from the input port to the storage bank flow controller.

In some aspects, the techniques described herein relate to a flow panel, further including a plurality of input ports, each input port coupled to a respective input flow controller and configured to be coupled to a respective storage bank.

In some aspects, the techniques described herein relate to a flow panel, where there is no check valve in a flow path between each input port and its respective input flow controller.

In some aspects, the techniques described herein relate to a method of controlling a flow of fuel from a storage bank to a dispenser, including: receiving a desired fuel pressure value; receiving indications of fuel pressures within each of a plurality of storage banks; selecting a desired storage bank having the lowest fuel pressure among the storage banks that have fuel pressures greater than the desired fuel pressure; and activating a desired input port and a desired output port of a flow control panel to enable fluid to flow from the desired storage bank to the dispenser.

In some aspects, the techniques described herein relate to a method, further including: monitoring the fuel pressure in the desired storage bank; determining that the fuel pressure in the desired storage bank has dropped below the desired fuel pressure; selecting a new desired storage bank, the new desired storage bank having the lowest fuel pressure among the storage banks that is greater than the desired fuel pressure; and activating a new desired input port to enable fluid to flow from the new desired storage bank to the dispenser.

In some aspects, the techniques described herein relate to a method, further including selecting the desired storage bank having the lowest fuel pressure among the storage banks that is greater than the desired fuel pressure plus a threshold amount.

In some aspects, the techniques described herein relate to a method, wherein the threshold amount is selected from the group consisting of: 10, 25, 50, 75, and 100 bar In some aspects, the techniques described herein relate to a method, wherein the threshold amount is selected by a user.

In some aspects, the techniques described herein relate to a method, wherein the flow control panel includes a plurality of input flow controllers configured to control the flow of stored fuel from a plurality of storage bank to a plurality of input ports; the plurality of input ports, each input port coupled to a plurality of output ports; the output ports, each output port coupled to a respective dispenser port, wherein each dispenser port is configured to be coupled to a dispenser; a plurality of output flow controllers, each output flow controller coupled to a respective input port and a respective output port, and configured to enable the flow of fuel from the input port and the output port; a storage bank input port coupled to an input fuel line and a plurality of storage bank flow controllers, each storage bank flow controller coupled to a respective input port, the method further including: determining a desired storage bank for filling and activating a desired storage bank flow controller and the input flow controller coupled to the input port that is coupled to the desired storage bank flow controller to enable fuel to flow from the input fuel line to the desired storage bank.

In some aspects, the techniques described herein relate to a method, wherein the flow control panel includes a plurality of input flow controllers configured to control the flow of stored fuel from a plurality of storage bank to a plurality of input ports; the plurality of input ports, each input port coupled to a plurality of output ports; the output ports, each output port coupled to a respective dispenser port, wherein each dispenser port is configured to be coupled to a dispenser; a plurality of output flow controllers, each output flow controller coupled to a respective input port and a respective output port, and configured to enable the flow of fuel from the input port and the output port; a storage bank input port coupled to an input fuel line and a plurality of storage bank flow controllers, each storage bank flow controller coupled to a respective input port, and a check valve located between each of the storage bank flow controllers and a respective input port, the method further including using the check valve to enable flow of fuel from the storage bank flow controller to the input port and to prevent flow from the input port to the storage bank flow controller.

In some aspects, the techniques described herein relate to a method, wherein the flow control panel includes a plurality of input flow controllers configured to control the flow of stored fuel from a plurality of storage bank to a plurality of input ports; the plurality of input ports, each input port coupled to a plurality of output ports; the output ports, each output port coupled to a respective dispenser port, wherein each dispenser port is configured to be coupled to a dispenser; a plurality of output flow controllers, each output flow controller coupled to a respective input port and a respective output port, and configured to enable the flow of fuel from the input port and the output port; and a plurality of input ports, each input port coupled to a respective input flow controller and configured to be coupled to a respective storage bank.

In some aspects, the techniques described herein relate to a method, wherein the flow control panel includes a plurality of input flow controllers configured to control the flow of stored fuel from a plurality of storage bank to a plurality of input ports; the plurality of input ports, each input port coupled to a plurality of output ports; the output ports, each output port coupled to a respective dispenser port, wherein each dispenser port is configured to be coupled to a dispenser; a plurality of output flow controllers, each output flow controller coupled to a respective input port and a respective output port, and configured to enable the flow of fuel from the input port and the output port; and where there is no check valve in a flow path between each input port and its respective input flow controller.

In some aspects, the techniques described herein relate to a method of controlling a flow of fuel from one of a plurality of storage banks to a dispenser, the method including: receiving an indication of fuel temperature within a dispenser; receiving an indication of a maximum desired fuel temperature; and activating a cold fuel controller configured to control a flow of cold fuel from a cold fuel line to allow the cold fuel from the cold fuel line to flow to a dispenser port when the indication of fuel temperature within the dispenser exceeds the maximum desired temperature.

In some aspects, the techniques described herein relate to a method, further including: activating a flow controller coupled to an output port that is coupled to a storage bank to allow the fuel from the storage bank to flow to a junction coupled to the cold fuel controller and the output port and to mix with the cold fuel from the cold fuel controller at the junction to create a fuel mixture; and maintaining the fuel mixture at a temperature that is below the maximum desired fuel temperature.

In some aspects, the techniques described herein relate to a method, further including controlling a flow of hydrogen gas from one of the plurality of storage banks to a respective input port.

In some aspects, the techniques described herein relate to a method of controlling a flow of fuel from a storage bank to a dispenser, the method including: receiving an indication of cooling fluid coupled to a cold fuel line; receiving an indication of a threshold temperature value; and activating a cold fuel controller configured to control a flow of cold fuel from a cold fuel line to allow the cold fuel from the cold fuel line to flow to a dispenser port when the indication of fuel temperature within the dispenser exceeds a threshold temperature value.

In some aspects, the techniques described herein relate to a method, further including: activating a flow controller coupled to an output port that is coupled to a storage bank to allow the fuel from the storage bank to flow to a junction coupled to the cold fuel controller and the output port and to mix with the cold fuel from the cold fuel controller at the junction to create a fuel mixture; and maintaining the fuel mixture at a temperature that is below the maximum desired fuel temperature.

In some aspects, the techniques described herein relate to a method, further including controlling a flow of hydrogen gas from one of the plurality of storage banks to a respective input port.

BRIEF DESCRIPTION OF THE DRAWINGS

FIG. 3 is a legend and descriptors of various components illustrated in the schematic of FIG. 2;

DETAILED DESCRIPTION

Hydrogen Fueling Station

Figure 1:
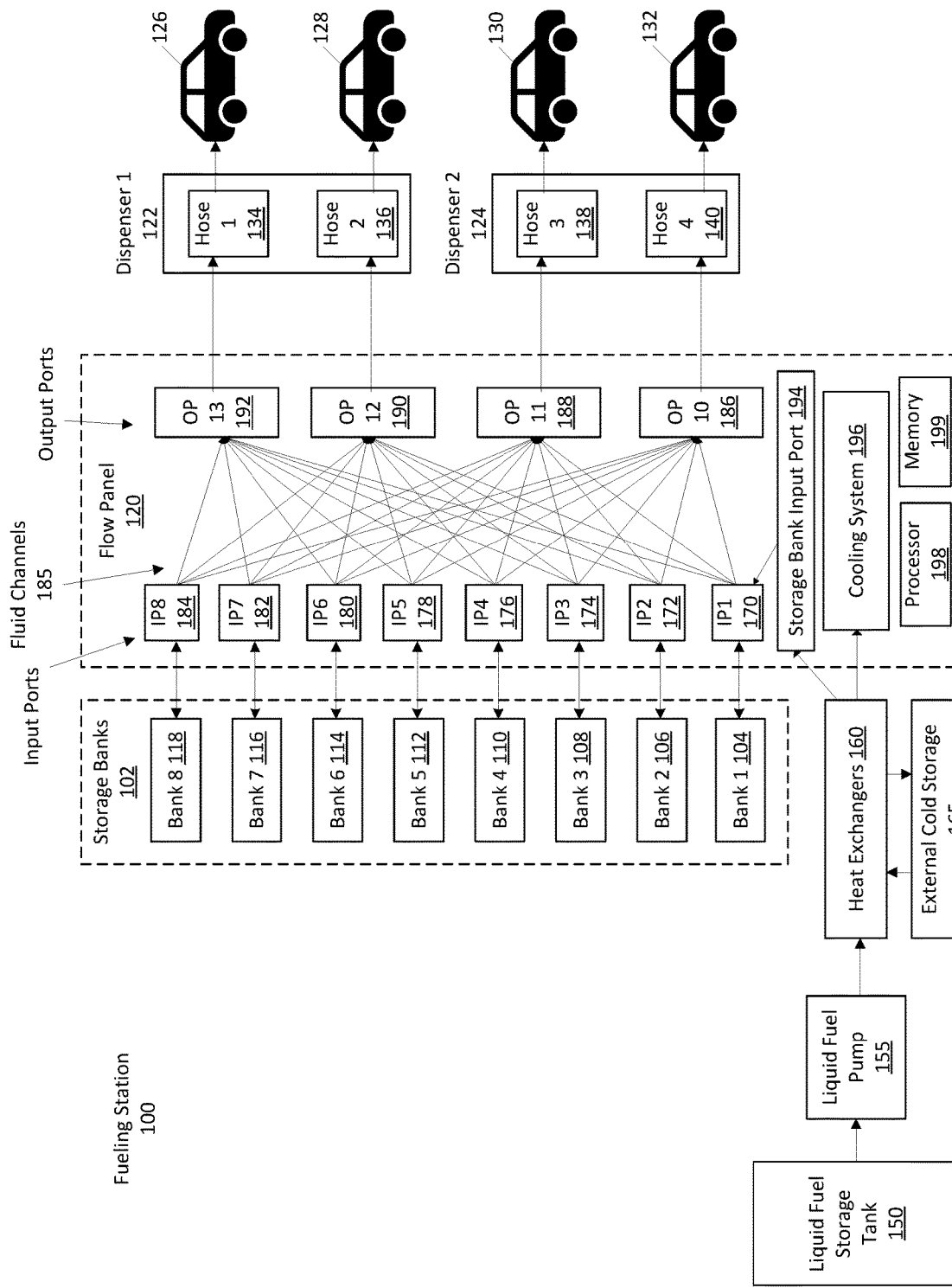
FIG. 1 provides a block diagram of one embodiment of a hydrogen fueling station.

FIG. 1 illustrates one embodiment of a hydrogen fueling station 100. The fueling station 100 includes multiple storage banks 102 of hydrogen gas. Each bank 104-118 may include one or more tanks (not shown) that are coupled together to store a larger volume of gas than an individual tank. Each storage bank 104-118 is coupled to a flow panel 120, which is sometimes referred to as a priority panel, or a flow controller. The flow panel 120 is coupled to one or more dispensers (Dispenser 1, Dispenser 2) 122, 124, which may be coupled to one or more vehicles 126, 132 to fuel the vehicles. Although the flow panel 120 of FIG. 1 (and in other embodiments described herein) receives gaseous hydrogen from the storage banks 102, the flow panel 120 may receive hydrogen from one or more sources, including storage banks, storage tanks, directly from a compressor or pump, etc.

In the illustrated embodiment, the fueling station 100 includes eight storage banks (Bank 1 through Bank 8) 104-118. Each storage bank 104-118 may be filled to a predetermined, desired pressure level. For example, in one embodiment, Banks 1 and 2 104, 106 are filled to 500 bar, Banks 3 and 4 108, 110 are filled to 700 bar, and Banks 5-8 112-118 are filled to 1,000 bar, where 1 bar equals 100 kPa, about 14.50377 psi or about 0.99 atm. In addition, each dispenser (Dispenser 1, Dispenser 2) 122, 124 includes two hoses 134-140. Each hose 134-140 may be connected to a vehicle 126-132 to fuel the vehicle 126-132.

A liquid fuel storage tank 150, a liquid fuel pump 155, heat exchangers 160, and an external cold storage system 165 are also shown. The liquid fuel storage tank 150 is configured to store liquid hydrogen fuel. The liquid fuel pump 155 can be a compressor or other pump that draws liquid fuel from the liquid fuel storage tank, converts it to a gas, and pumps the gas to the flow panel 120, which directs the gas to one or more storage banks 102. In some embodiments, multiple liquid fuel storage tanks 150 and/or multiple liquid fuel pumps 155 are provided. The pump 155 may pump the fuel directly or indirectly into the flow panel 120, directly into one or more storage banks 104-118, or both.

The output of the liquid pump 155 (or a manifold (not shown)) may be fluidly connected to one or more heat exchangers 160 that are connected to an external cold storage system 165. The heat exchangers 160 and external cold storage system 165 can include devices to cool a stored fluid (e.g., a brine) and then use the cooled fluid to control the temperature of fuel delivered to a vehicle 126-132 during fueling. For example, a tank of brine housed in the external cold storage system 165 can be cooled by heat exchange with the very cold hydrogen gas from the liquid pump 155. Additional details regarding the external cold storage 165 and the heat exchangers 160, are discussed with respect to FIG. 2, below.

The flow panel 120 includes multiple input ports (IP1 through IP8) 170-184, multiple output ports (OP10 through OP13) 186-192, a storage bank input port 194, a cooling system 196, a processor 198 and a memory 199. Each input port (IP1 through IP8) 170-184 is in fluid communication with a corresponding storage bank (Bank 1 through Bank 8) 104-118. Each output port (OP10 through OP13) 186-192 is in fluid communication with a corresponding dispenser hose (Hose 1 through Hose 4) 134-140. Multiple flow channels 185 connect each input port 170-184 to each output port 186-192.

Multiple solenoids (e.g., input flow controllers 200, output flow controllers 202, storage bank flow controllers 204) and one-way valves (or check valves 206) (see FIG. 2) enable the processor 198 to control the flow of gas between the storage banks 102, and the dispenser hoses 134-140. The processor 198 is also configured to control the flow of hydrogen gas from the liquid fuel pump 155 (received either directly from the liquid fuel pump 155 or from the heat exchangers 160) to a storage bank input port 194, and to one or more storage banks 104-118 in order to refill a storage bank 104-118 when necessary.

The cooling system (or internal cooling system) 196 may be used to control the temperature of the gaseous fuel delivered from a storage bank 104-118 to a dispenser hose 134-140, as discussed in greater detail, below. A memory 199 stores information received from the dispensers 122-124 that is used by the processor 198 to determine the optimal storage bank 104-118 to access to fuel a particular vehicle 126-132. The memory 199 may also store instructions that when executed by the processor 198 configure the processor 198 to perform any of the methods or processes discussed herein.

Each dispenser 122-124 is configured to communicate to the flow panel 120 a desired fuel pressure (e.g., a minimum fuel pressure) and temperature. The flow panel 120 can control the pressure of fuel provided to the dispenser 122-124 by drawing fuel from a bank 104-118 storing gas hydrogen at or above the desired fuel pressure. In addition, the temperature of the hydrogen in a bank 104-118 may rise due to ambient weather conditions. For example, since the storage bank 104-118 is typically located outdoors, in warm weather, the temperature of the gas inside each storage bank 104-118 may rise. Therefore, to provide cooler hydrogen fuel to the dispenser 122-124, the flow panel 120 may instead draw very cold hydrogen gas from the liquid p 155 (e.g., via the cooling system 196) and either provide the cold hydrogen gas directly to the dispenser 122-124 or combine the cold hydrogen gas with gas received from one or more banks 104-118. The cooling system 196 coupled to the flow panel 120 can control whether the flow panel 120 draws cold hydrogen gas from the liquid pump 155, and whether it provides the cold hydrogen gas directly to a dispenser 122-124 (e.g., directly or via the cooling system 196), or whether it mixes it with gas from one or more banks 104-118. Additional details regarding the cooling system 196 and fuel temperature control are discussed further, below.

Figure 2:
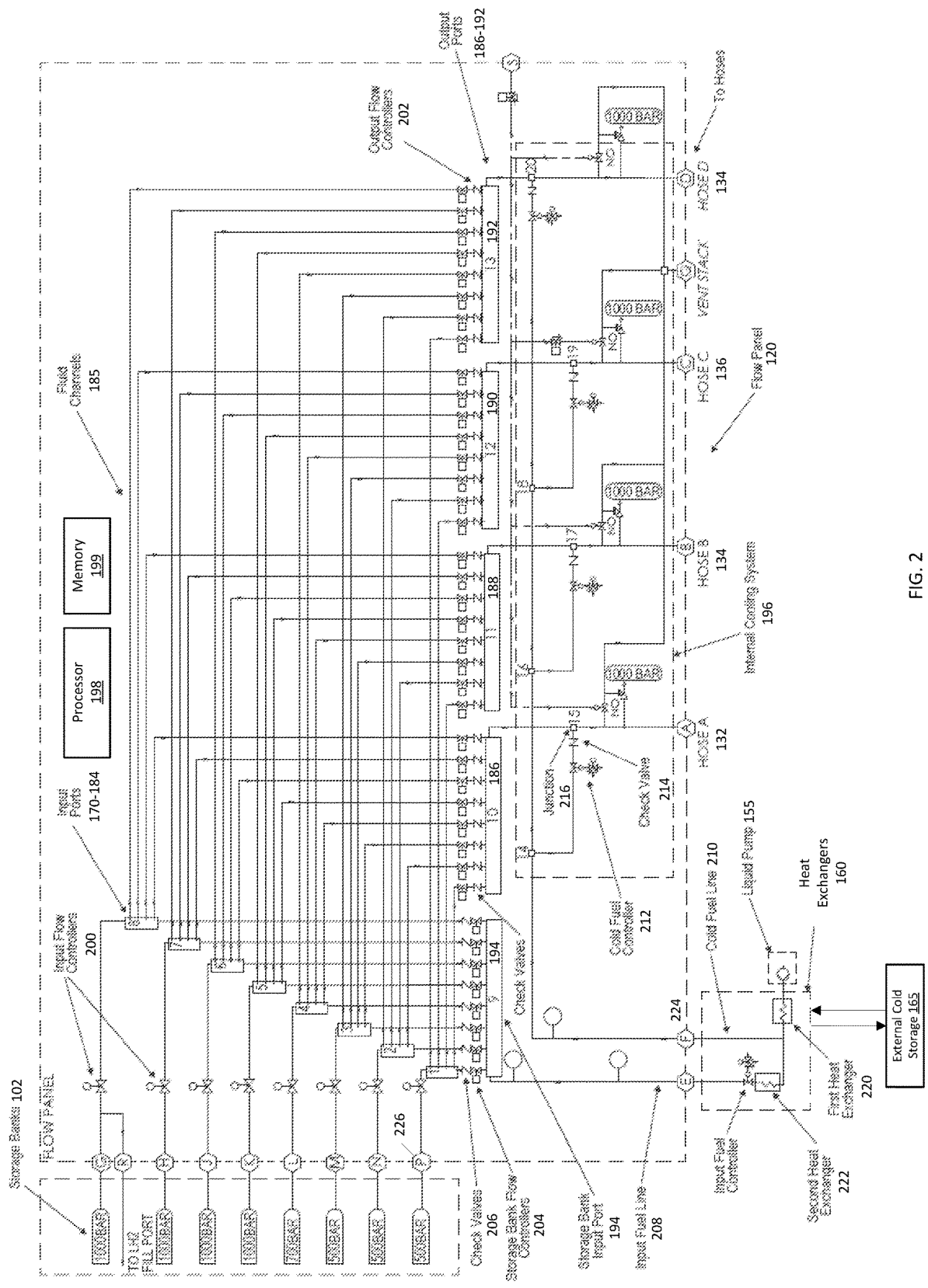
FIG. 2 is a schematic view of one embodiment of the flow controller, or flow panel, of FIG. 1.

FIG. 2 illustrates a schematic view of the priority panel 120, or flow panel, of FIG. 1. FIG. 2 illustrates the heat exchangers 160, the liquid fuel pump 155, and the storage banks 102 of FIG. 1, as well. The flow panel 120 may include one input port 170-184 for each storage bank 102, and one output port 186-192 for each dispenser hose 134-140. The illustrated embodiment of FIG. 2 includes 8 input ports (Input Ports 1-8) 170-184 and four output ports (Output Ports 10-13) 186-192, although any number of input and output ports may be provided. An additional storage bank input port (Port 9) 194 is also provided. The storage bank input port (Port 9) 194 is used to fill the storage banks 102 with hydrogen gas received from the liquid pump 155. For example, the storage bank input port (Port 9) 194 receives hydrogen gas from the liquid pump 155 (e.g., compressor) and directs the hydrogen gas from the liquid pump 155 to a selected one or more of the eight storage banks 102 (e.g., via Input Ports 1-8 170-184 and input flow controllers 200). The output of each storage bank 102 is coupled to an input port 170-184 of the flow panel 120. Multiple fluid channels 185, or flow paths, (e.g., gas conduits, tubes, pipes, etc.) extend from the input ports 170-184 of the flow panel 120 to the output ports 186-192 of the flow panel 120. For example, each input port 170-184 may be connected to each output port 186-192. Therefore, in the illustrated embodiment, for each of the eight input ports (Input Port 1-8) 170-184, four flow channels 185 are provided; one flow channel 185 to connect each input port 170-184 to each output port (Output Port 10-13) 186-192, resulting in a total of 32 flow channels 185. An additional 8 flow channels 185 couple the input ports 190-184 to the storage bank input port (Port 9) 194, as well.

Each flow channel 185 may be connected to flow control hardware, or a flow controller 200, 202, 204 (e.g., solenoid, etc.) located at each end of each flow channel 185 to selectively enable fluid flow between a desired input port 170-184 and a desired output port 134-140. In the illustrated embodiment, input flow 200 controllers are positioned between each storage bank 102 and each input port 170-184 and output flow controllers 202 are positioned between each fluid channel 185 output and each output port 186-192. Check valves 206 (which allow only one-way gas flow) are also provided between each output flow controller 202 and each output port (Ports 10-13) 186-192, and between the storage bank flow controllers 204 coupled to the storage bank input port (Port 9) 194 and the input ports (Ports 1-8) 170-184. However, in other embodiments, flow controllers may be located in other locations in addition to, or instead of the illustrated locations. For example, flow controllers may be positioned between the input ports 170-184 and the fluid channel 185 inputs and/or between the output ports 186-192 and the dispenser hoses 134-140.

In some implementations, one or more fuel lines (e.g., an input fuel line 208, a cold fuel line 210, or both) connect the liquid pump 155 to the flow panel 120. These fuel lines 208, 210 may be used to refill the storage banks 102 and to control the temperature of the fuel that is delivered by the flow panel 102 to a dispenser 122, 124.

The temperature of the hydrogen gas fuel provided by the liquid pump 155 is typically significantly cooler than the temperature of the fuel stored in the storage banks 102. Therefore, by providing and controlling a mixture of colder fuel from the liquid pump 155 with warmer fuel from the storage banks 102, a desired fuel temperature for delivery to a dispenser 122, 124 (and/or dispenser hose 134-140) may be achieved, as discussed further below. An input fuel line 208 may be coupled to one or more heat exchangers, cooling blocks, or temperature controllers of the heat exchangers 160. The input fuel line 208 may provide cold gaseous hydrogen into the fuel line that extends between the flow panel input ports 170-184 to the dispensers 122-124 or dispensing hoses 134-140 (e.g., from the liquid pump 155, through the heat exchangers 160, to the storage bank input port (Port 9) 194, to an input port 170-184 (e.g., one or more of Port 1-8), and then to one or more desired output ports 186-192 (e.g., Port 10-13) by activating and deactivating corresponding desired flow controllers 200, 202, 204). Alternatively, or in addition, cold gaseous hydrogen fuel from the liquid pump 155 may be directed to an internal cooling system 196 via a cold fuel line 210. The internal cooling system 196 may include one or more cold fuel controllers 212 (e.g., solenoids, valves, etc.). The cold gas from the cold fuel line 210 and cold fuel controller 212 may pass through a check valve 214 and into a junction 216. The junction 216 also receives warmer hydrogen gas from a storage bank 102 via an output port 186-192 (e.g., Port 10-13). The cold fuel controller 212 and junction 216 allow for cold hydrogen gas received from the liquid pump 155 via the cold fuel line 210 to mix with the warmer hydrogen received from the storage banks 102. The junction 216 may act as a mixing point, and it may be located in a dispensing line or any of the lines internal or external to the flow panel 120). This allows for control of the fuel temperature during vehicle fueling and can ensure that the temperature of the fuel entering the vehicle stays within the parameters defined by the appropriate fueling protocol and meets any fuel temperature requirements provided by the dispenser 122, 124.

In addition, the cold gaseous hydrogen from the liquid pump 155 may be used to cool the cooling fluid of an external cold storage system 165 (e.g., via a first heat exchanger 220). The cold gaseous hydrogen from the liquid pump 155 may be warmed prior to storage in a storage bank 102, as well (e.g., via a second heat exchanger 222). If the cold hydrogen gas from the liquid pump 155 is not warmed, the lines within the flow panel 120 and extending from the flow panel 120 to the storage banks 102 may freeze. For example, as shown in FIG. 2, liquid hydrogen from a liquid storage tank (not shown in FIG. 2 but shown in FIG. 1) is pumped into a heat exchanger, e.g., first heat exchanger 220 (sometimes referred to as a cooling block) with a liquid pump 155. The heat exchanger 220 can include a tube or coiled tube that is submerged within a brine bath. The temperature of the hydrogen gas is typically colder than the temperature of the brine. Therefore, the first heat exchanger 220 may be used to further cool the temperature of the brine. The brine circulates through the first heat exchanger 220, where it is cooled and then circulates back to a brine storage tank within the external cold storage system 165. The brine bath is maintained at a very cold temperature and may be used by a dispenser 122, 124 in a first, closed cooling loop, to cool gaseous hydrogen (e.g., to a temperature within a range of −40 to −17.5° C.) received from the flow panel 120.

The cold hydrogen gas may be selectively directed after the first heat exchanger 220 through fuel lines or flow channels 185 (e.g., via Port F 224) to the flow panel's internal cooling system 196. As discussed above, the flow panel's internal cooling system 196 may include one or more cold fuel controllers 212 that are configured to mix the cold hydrogen gas received from the liquid pump 155 with warmer, stored hydrogen gas that is received from the output ports 186-192 (Ports 10-13). The cold fuel controller 212 controls the amount of mixing of cool and warm hydrogen gas to achieve a desired output gas temperature. For example, the cold fuel controller 212 may be in communication with one or more temperature sensors (not shown) to measure the temperature of one or more of the cold hydrogen gas, the warmer stored hydrogen gas, or the mixture of cooled and warmer hydrogen gases. The temperature-controlled hydrogen gas mixture is directed to a dispenser 122, 124 or to an output hose 134-140 (e.g., Ports A-D). The cold fuel mixing controllers 212 may also include one or more solenoids or other electrically or manually controlled valves to control the cold hydrogen gas flow.

Warmed brine may be directed to a second heat exchanger 222 to warm the gaseous hydrogen from the liquid pump 155 prior to storage in the storage banks 102 to make sure that the gas lines (e.g., input fuel line 208 and all lines 185 leading to the storage bank input port 194, input ports 170-184, flow controllers 200 and storage banks 102) do not freeze. The second heat exchanger 222 warms the hydrogen gas, which in turn cools the brine. The cooled brine may be circulated back to a brine storage tank for future use. For example, a heater in the brine storage tank may warm the brine so that it may be re-used to warm the hydrogen gas passing through the second heat exchanger in the future.

When the warmed hydrogen gas fuel is directed through the storage bank input port 194 (e.g., Port 9), flow controllers 204 coupled to the storage bank input port's manifold 194 may be selectively activated to control the direction of warmed fuel flow. For example, when the leftmost flow controller 204 coupled to the storage bank input port 194 is activated, warmed fuel will flow through the storage bank input port 194 (e.g., Port 9), through Input Port 1 170, and towards a storage bank (e.g., a storage bank coupled to Port P 226).

As discussed above, when the cold hydrogen gas fuel (e.g., from the first heat exchanger 220) is directed to a filling hose 134-140 or dispenser 122, 124, a cold fuel controller 212 corresponding to the desired filling hose 134-140 (e.g., Hose A-D) may be activated to enable the cold hydrogen fuel to flow towards the desired hose 134-140 or dispenser 122, 124. In some implementations, the cold hydrogen fuel mixes with the warmer hydrogen fuel supplied by the storage bank 102 within the fuel line connected to the dispenser hose 134-140. In other implementations, the cold hydrogen fuel and the warmer hydrogen fuel supplied by the storage bank 102 are alternated, or pulsed, (e.g., a pulse of cool fuel and a pulse of warmer fuel are cycled one after the other) and provided to the dispenser hose 134-140. In another implementation, cold hydrogen fuel is not mixed with warmer hydrogen, and the cold hydrogen is directed to the desired hose 134-140 or dispenser 122, 124.

Figure 3:
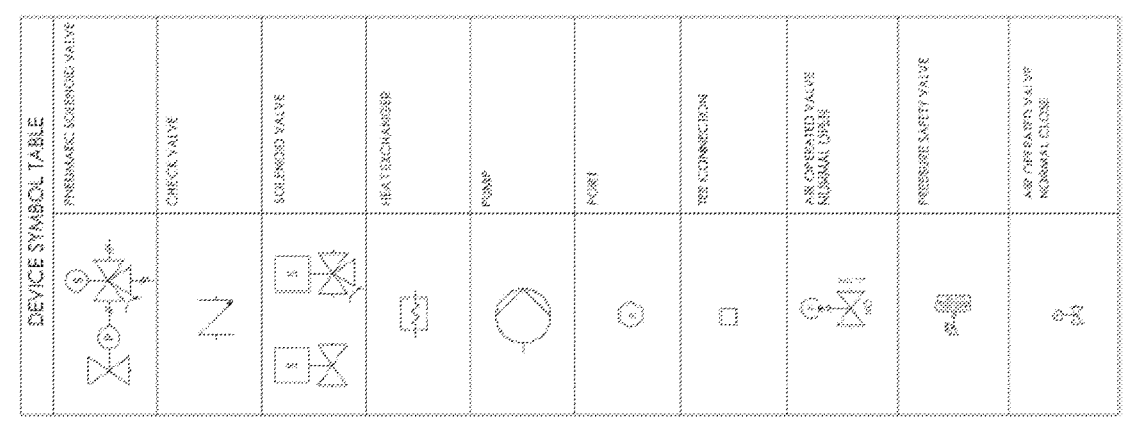

FIG. 3 includes a legend of various symbols and tags associated with the components of FIG. 2, including a pneumatic solenoid valve, a check valve, a solenoid valve, a heat exchanger, a pump, a port, a tee connection, air operated valves (normally open and normally closed) and a pressure safety valve.

Temperature Control

Figure 4:
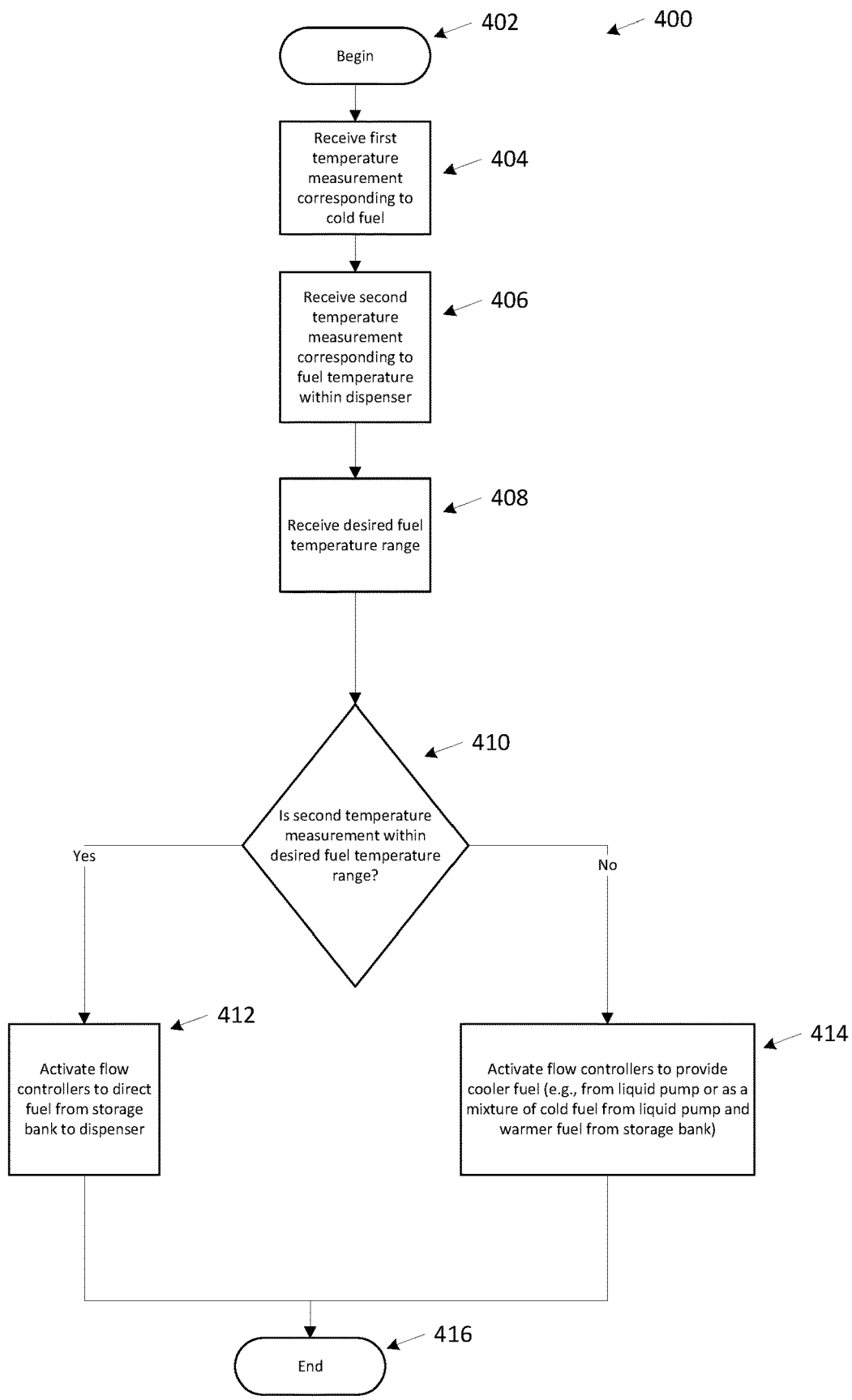
FIG. 4 is a flow chart illustrating a method of controlling fuel temperature during fueling using the flow panel of FIG. 1 or 2.

A method 400 of controlling hydrogen fuel temperature during fueling is illustrated in FIG. 4. The method 400 begins at block 402. A processor within the flow panel can receive a measurement of the cold hydrogen gas temperature coupled to the flow panel at block 404. For example, the measured temperature can correspond to the temperature of the gas output from the liquid pump, or output from the first or second heat exchanger, as shown in FIG. 2. The processor may also receive a measurement of hydrogen gas temperature that is output by a fuel dispenser at block 406 as well as a desired fuel temperature (or desired range of fuel temperatures) from a fuel dispenser at block 408. The flow panel can then determine at block 410 if the temperature of the fuel that is output by the fuel dispenser is cool enough to meet the desired fuel temperature, or whether it is within the desired range of fuel temperatures. If it is, the method 400 proceeds to block 412 where the flow panel can activate one or more flow controllers to allow fuel to flow from a storage bank, through a selected input port, through a selected output port, and to a desired dispenser hose. If it is not (e.g., if the temperature of the fuel dispensed by the dispenser is too warm), the method 400 proceeds to block 414 where the flow panel can also activate a cold fuel controller to allow the warm fuel from the storage bank to mix with cold fuel from a cold fuel line and direct the mixture of warm and cool fuel to a desired dispenser hose. Alternatively, if the temperature of the fuel dispensed by the dispenser is not within the desired temperature range, the flow panel can activate a cold fuel controller to allow the cold fuel from a cold fuel line to flow to a desired dispenser or dispenser hose without mixing the cold fuel with warmer fuel from a storage bank. The method 400 ends at block 416.

Figure 5:
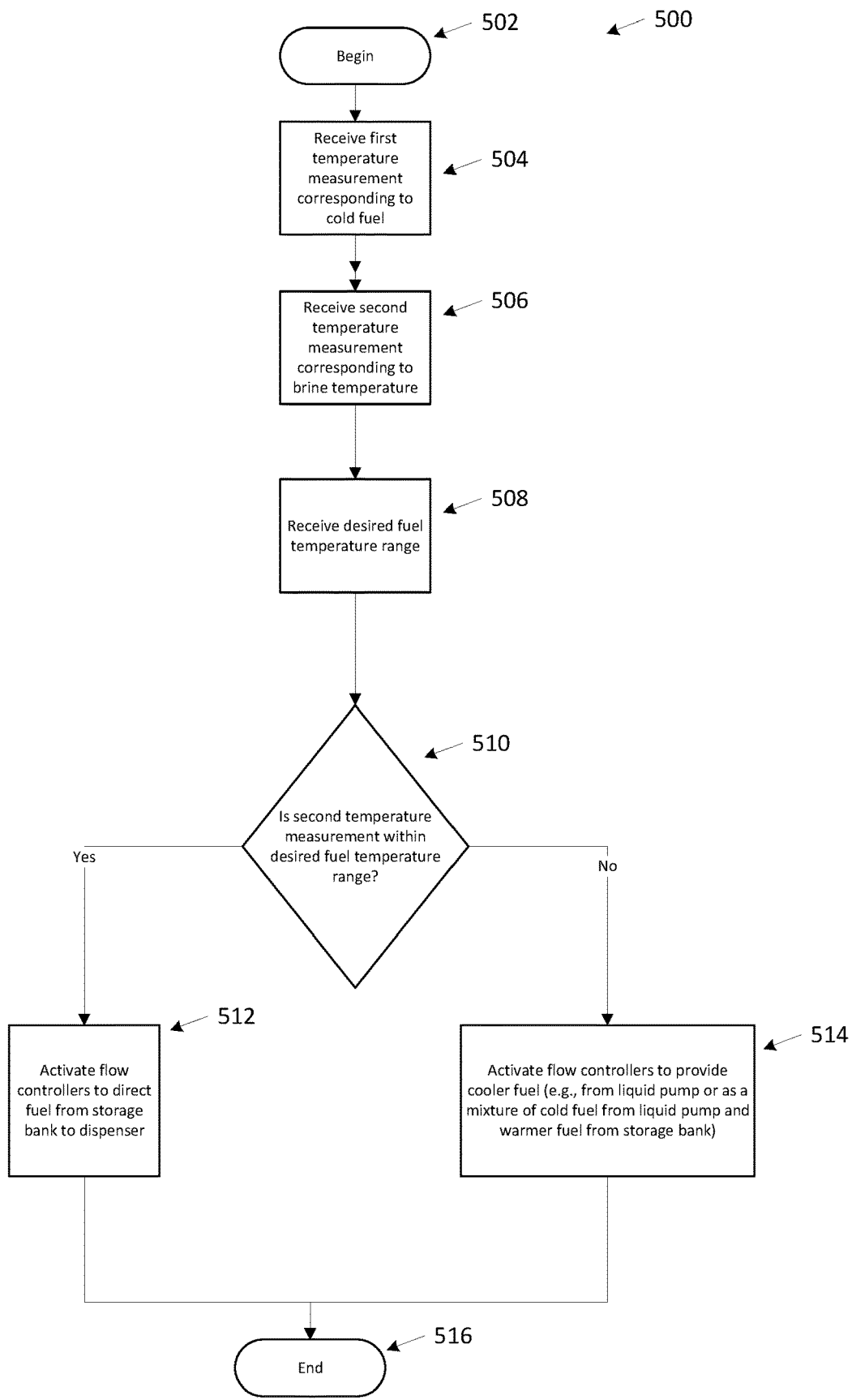
FIG. 5 is a flow chart illustrating another method of controlling fuel temperature during fueling using the flow panel of FIG. 1 or 2.

Another method 500 of controlling hydrogen fuel temperature during fueling is illustrated in FIG. 5. The method 500 begins at block 502. A processor within the flow panel can receive a measurement of the cold hydrogen gas temperature coupled to the flow panel at block 504. For example, the measured temperature can correspond to the temperature of the gas output from the liquid pump, or output from the first heat exchanger, as shown in FIG. 2. The processor may also receive a measurement of an indication of the temperature of a coolant coupled to a cold fuel line at block 506. For example, the processor may receive an indication of the temperature of brine circulating in a heat exchanger (e.g., the first heat exchanger 220 of FIG. 2) from a thermometer or thermistor coupled to the heat exchanger and/or brine bath. The processor may also receive a desired fuel temperature (or desired range of fuel temperatures) from a fuel dispenser at block 508. The flow panel can then determine if the temperature of the fuel that is output by the fuel dispenser is cool enough to meet the desired fuel temperature, or whether it is within the desired range of fuel temperatures based upon the indication of the coolant temperature at block 510. For example, if the coolant temperature is above a certain threshold level, the processor may determine that the brine is not cool enough to cool the fuel within the dispenser to the desired fuel temperature (or within the desired range of fuel temperatures). If the temperature of the coolant is below the threshold level, the method 500 proceeds to block 512 where the flow panel can activate one or more flow controllers to allow fuel to flow from a storage bank, through a selected input port, through a selected output port, and to a desired dispenser hose. If it is not (e.g., if the temperature of the coolant is too warm), the flow panel can activate a cold fuel controller to allow the warm fuel from the storage bank to mix with cold fuel from a cold fuel line and direct the mixture of warm and cool fuel to a desired dispenser hose at block 514. Alternatively, if the temperature of the coolant is not below the threshold level, the flow panel can activate a cold fuel controller to allow the cold fuel from a cold fuel line to flow to a desired dispenser or dispenser hose without mixing the cold fuel with warmer fuel from a storage bank at block 514. The method 500 ends at block 516.

Storage Bank Selection

Figure 6:
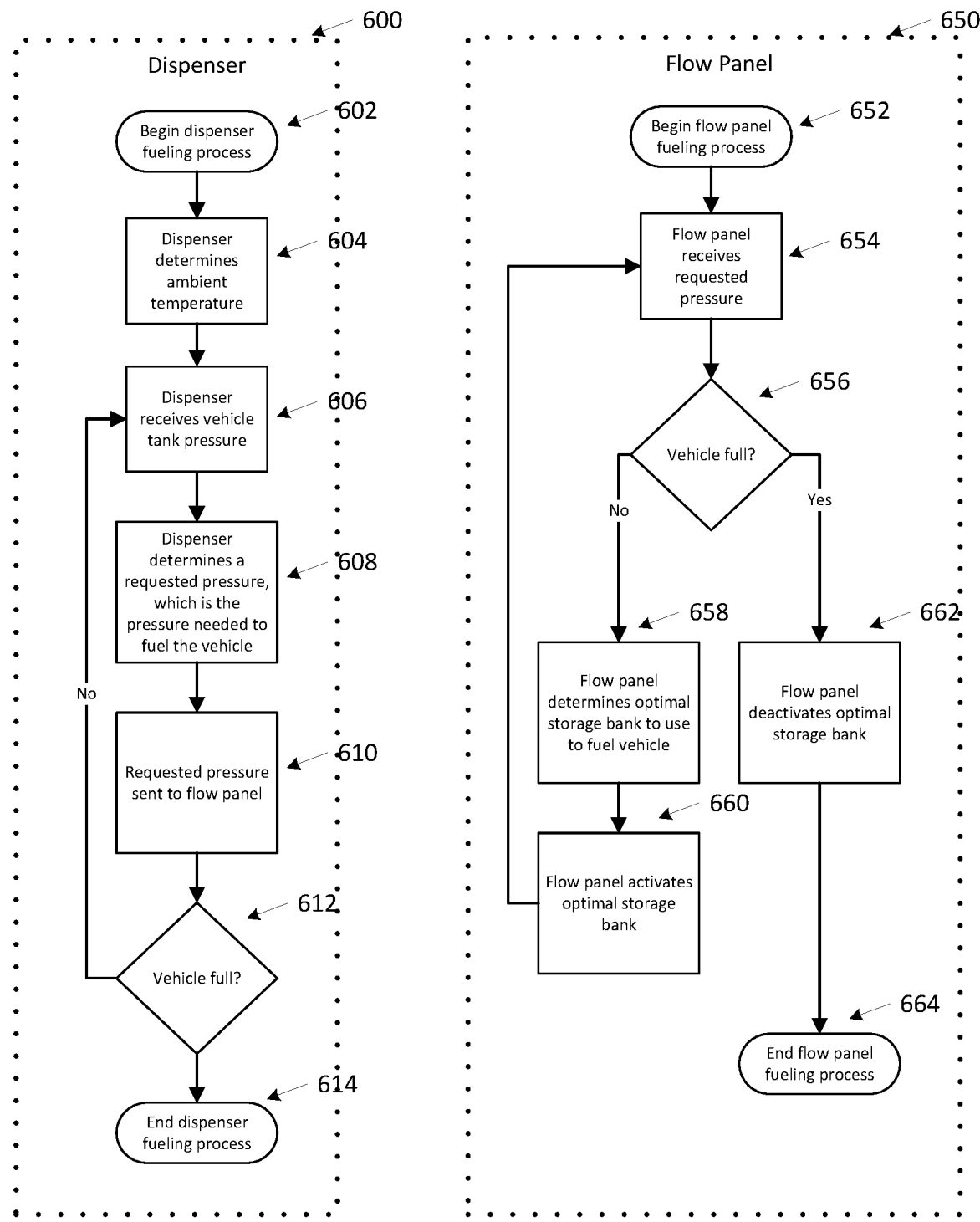
FIG. 6 is flow chart showing one embodiment of a method for controlling the flow of hydrogen gas from a storage bank to a fuel dispenser that may be implemented by the flow panel of FIG. 1 or 2.

FIG. 6 includes flows chart of dispenser 600 and priority panel 650 (or flow panel or flow controller) logic to select a desired storage bank and to route fluid from the desired storage bank to a selected dispenser hose. The flow panel can include a controller or microprocessor that determines one or more desired storage banks for a selected dispenser hose, activates desired flow controllers to route fuel from the desired one or more storage banks to the selected dispenser hose.

As shown in FIG. 6, the dispenser fueling process 600 begins at block 602. At block 602, a user may engage or attach a dispenser hose to the user's vehicle to begin the dispenser fueling process 600. The dispenser may determine the ambient temperature at block 604, and receive temperature and pressure values from the user's vehicle at block 606. The received temperature and pressure values correspond to the temperature and pressure within the vehicle's fuel tank. The dispenser may then calculate a "requested pressure," which is the fuel pressure required to fuel the vehicle based on the fueling protocol being utilized at block 608. In some cases, the calculated requested pressure may be based upon the received temperature and pressure values, and in other cases it may be based upon the fuel delivery temperature at the dispenser outlet along with other factors. The dispenser sends the required pressure value and optionally a dispenser identification to the priority panel. The dispenser may determine if the vehicle is full, for example, by receiving a signal from the flow panel, or by monitoring the fuel level or pressure within the vehicle's tank at block 612. If the vehicle is not full, the process 600 may return to block 606, where the dispenser may again receive temperature and pressure values from the vehicle. Temperature and pressure values may be received periodically, such as once every second, or at any other desired frequency. If the vehicle is full, the process 600 continues to block 614, where the process 600 ends.

The flow panel fueling process 650 begins at block 652 when the dispenser hose is attached to the user's vehicle, as well. For example, the dispenser may send a signal to the flow panel to indicate that vehicle fueling is required. The flow panel receives the required (or requested) pressure value (and optionally the dispenser identification) from the dispenser at block 654. At block 656, the flow panel determines if the vehicle is full. For example, the flow panel may receive a signal from the dispenser that the vehicle is full, or it may determine that the vehicle is full using another method. If not, the process 650 proceeds to block 658 where the flow panel identifies a storage bank that has the lowest pressure that currently exceeds the requested pressure value by a threshold amount. The threshold amount may be zero or may be a value greater than zero. In some embodiments, the threshold amount is determined as a percentage of the requested value.

For example, if the fueling station has four storage banks, the fuel pressures in banks 1, 2, 3, and 4 may be 100 bar, 250 bar, 500 bar, and 1000 bar, respectively. If the dispenser indicates that a desired fueling pressure is 350 bar, and the threshold amount is 50 bar, then the flow panel will select the storage bank having the lowest fuel pressure that is greater than 400 bar (350 bar requested pressure+50 bar threshold). In this example, the flow panel would initially select bank 3 (having a pressure of 500 bar) to fuel the vehicle.

The priority panel activates the relevant flow controllers to cause fuel to flow from the selected storage bank and the fluid output port that is currently coupled to the dispenser hose associated with the user's vehicle at block 660. For example, the dispenser identification may be used to determine the particular output port flow controller to activate.

Fuel is then routed from the selected storage bank to the user's dispenser hose through the flow panel. As the vehicle is fueled, the pressure and temperature of the user's vehicle may change, and the pressure in the storage banks may change, as well. The pressure and temperature of the fuel in the user's vehicle may be used to determine when to stop fueling. In addition, the temperature of the fuel in the user's vehicle may be used to control the pressure and temperature of the hydrogen gas that is delivered to the user's vehicle, as discussed above. The process returns to block 654 to receive updated requested pressure values from the dispenser.

Fueling continues until at block 656 the process 650 determines that the vehicle is filled, and the dispenser indicates to the priority panel that additional fuel is no longer required. For example, during fueling, the dispenser periodically receives updated temperature and pressure values from the vehicle (e.g., every one second), and determines whether to continue fueling or not. When filled, the process 650 proceeds to block 662 where the flow panel deactivates the selected, activated storage bank and fueling stops. The process 650 proceeds to block 664 where the flow panel fueling process 650 ends.

In addition, the priority panel continually monitors the pressure in the storage banks. Each bank may store a particular amount of hydrogen gas. As the gas is depleted (e.g., during vehicle filling), the pressure in the bank drops. Once the pressure in the selected bank drops to within a threshold amount of the requested pressure, the priority panel may identify a different storage bank from which it draws fluid at block 658. The threshold amount may be zero or may be a value greater than zero. In some embodiments, the threshold amount is determined as a percentage of the requested value. When a different storage bank is identified, the priority panel may send a control signal to close the fluid controller (e.g., solenoid) coupled to the current storage bank, and send a control signal to open the fluid controller coupled to the different storage bank at block 660.

Storage Bank Refilling

Figure 7:
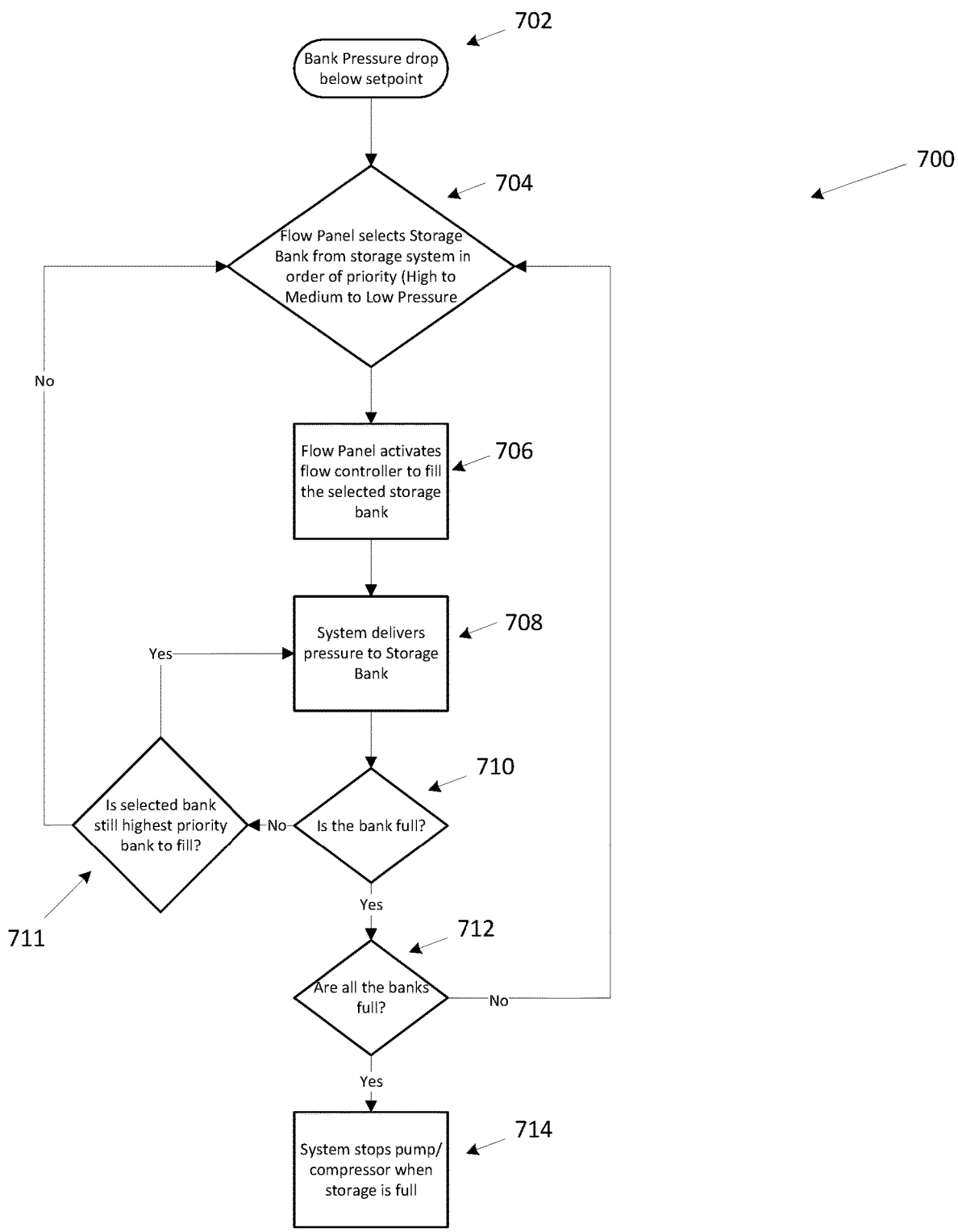
FIG. 7 is a flow chart showing one embodiment of a method of monitoring and re-filling a gaseous hydrogen storage bank as pressure is depleted that may be implemented by the flow panel of FIG. 1 or 2.

Furthermore, when the pressure in a pressure bank drops below a setpoint plus an offset amount, or predetermined level plus an offset amount, the amount of gaseous fuel within the pressure bank may need to be refilled, e.g., from a liquid storage tank, as shown in FIG. 1. The offset amount may be zero or may be a value greater than zero. In some embodiments, the offset amount is determined as a percentage of the setpoint value. FIG. 7 illustrates a flow chart of one method 700 of refilling a storage bank with any of the priority panels described herein.

At block 702, a priority panel determines that the pressure in one or more storage banks has dropped below the setpoint amount (or the setpoint amount plus an offset amount) associated with the respective storage bank. At block 704, the priority panel selects which of the storage banks to fill first. For example, in one embodiment, the priority panel selects (from the group of storage banks that are to be refilled) the storage bank with the highest pressure, as the storage bank to fill first, although in other embodiments, a different bank (e.g., lowest pressure, middle pressure, etc.) is selected. At block 706, the priority panel activates a flow controller to allow fluid to flow into the storage bank. At block 708, the system delivers pressure to the storage bank. For example, a liquid fuel pump may be activated by the priority panel to convert liquid fuel into a gaseous state and cause the gaseous fuel (hydrogen) to flow into the flow panel, such as illustrated in FIG. 1. In addition, bank hysteresis is set such that one or more vehicles can be fueled before pump or compressor turns on to refill the bank.

At block 710, the priority panel determines if the storage bank is full. If not, the method 700 proceeds to block 711. At block 711, the method 700 determines if the selected bank is still the highest priority bank to fill. For example, if the initially-selected highest priority bank was a medium pressure bank, but during refilling, a higher pressure bank falls below its setpoint pressure (or setpoint plus offset pressure), then the flow panel may determine that the high pressure bank should be refilled as the highest priority. In such case, the method 700 will deactivate the flow controller that has been activated, and the method 700 will return to block 704, where a new priority bank is selected.

At block 711, if the method 700 determines that the currently-selected bank is still the highest priority bank to fill, the method returns to block 708, where the flow panel maintains the open state of the storage bank, allowing gaseous fuel to flow from the fuel pump into the storage bank. If the storage bank is full, the flow controller to the storage bank is closed, and the method 700 proceeds to block 712. At block 712, the priority panel determines if all banks are full. If not, the method 700 returns to block 704 where the next priority bank is filled. Once all banks are full, the method 700 proceeds to block 714. At block 714, the priority panel causes the fluid pump (e.g., compressor) to stop pumping, and the method 700 ends.

Other Considerations

In some embodiments, systems and components as described herein can take the form of a computing system that is in communication with one or more computing systems and/or one or more data sources via one or more networks. The computing system may be used to implement one or more of the systems and methods described herein. While various embodiments illustrating computing systems and components are described herein, it is recognized that the functionality provided for in the components and modules (which may also be referred to herein as engines) of computing system may be combined into fewer components and modules or further separated into additional components and modules. Modules can include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Any modules can be executed by one or more CPUs.

A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein can be implemented as software modules but may be also represented in hardware or firmware. Generally, the modules described herein refer to logical modules that may be combined with other modules or divided into sub-modules despite their physical organization or storage. In addition, all the methods described herein may be executed as instructions on a CPU and may result in the manipulation or transformation of data.

In some embodiments, hardware components of the system include a CPU, which may include one, two, or more conventional microprocessors. The system further includes a memory, such as random-access memory ("RAM") for temporary storage of information and a read only memory ("ROM") for permanent storage of information, and a mass storage device, such as a hard drive, flash drive, diskette, or optical media storage device. Typically, the modules of the system are connected using a standard based bus system. In different embodiments, the standard based bus system could be Peripheral Component Interconnect ("PCP"), Microchannel, Small Computer System Interface ("SCSI"), Industrial Standard Architecture ("ISA") and Extended ISA ("EISA") architectures, for example.

In some embodiments, systems and components thereof can be operatively coupled to a destination modality that can be an email or other messaging modality; SAMBA, Windows, or other file sharing modality; FTP or SFTP server modality; a VPN; a printer; and the like. In accordance with some embodiments, systems may be software or hardware-software systems. For example, systems can include a communication engine configured to receive and transmit information.

In accordance with some embodiments, communication engine may be any software or hardware software-system configured to receive and/or transmit data. Communication engine may be configured to transmit and receive data over a variety of network interfaces including wired and wireless networks or a combination thereof, such as via Ethernet, 802.11x, Bluetooth, FireWire, GSM, CDMA, LTE, and the like. Communication engine may also be configured to transmit and/or receive data with file transfer protocols such as TCP/IP, as well as various encryption protocols, such as, for example, WEP, WPA, WPA2, and/or the like.

Various other modifications, adaptations, and alternative designs are of course possible in light of the above teachings. Therefore, it should be understood at this time that within the scope of the appended claims the invention may be practiced otherwise than as specifically described herein. It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited. The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

We claim:

1. A flow control panel configured to control the flow of fuel from a storage bank to a dispenser, comprising:
    a cold fuel controller configured to control the flow of cold fuel from a cold fuel line wherein the cold fuel line is configured to receive cold hydrogen fuel from a liquid pump;
    a dispenser port in fluid communication with the cold fuel controller; and
    a processor, wherein the processor is configured to receive an indication of fuel temperature within a dispenser and activate the cold fuel controller to allow the cold fuel from the cold fuel line to flow to the dispenser port when the indication of fuel temperature within the dispenser exceeds a maximum temperature determined by the dispenser.

2. The flow control panel of claim 1, wherein the temperature of hydrogen fuel flowing to the dispenser port has a temperature between −40 and −17.5° C.

3. The flow control panel of claim 1, further comprising:
an output port coupled to the storage bank;
a flow controller coupled to the output port and configured to control the flow of fuel from the storage bank to the output port; and
a junction coupled to the cold fuel controller and the output port,
wherein the processor is further configured to activate the flow controller to allow the fuel from the storage bank to flow to the junction and mix with the cold fuel from the cold fuel controller at the junction to create a fuel mixture, and to maintain the fuel mixture at a temperature that is below the maximum fuel temperature determined by the dispenser.

4. The flow control panel of claim 3, further comprising a check valve located between the cold fuel controller and the junction.

5. The flow control panel of claim 3, further comprising a check valve located between the output port and the storage bank.

6. The flow control panel of claim 3, wherein the dispenser port is configured to couple the flow controller to the dispenser.

7. The flow control panel of claim 3, wherein the output port is coupled to a plurality of input ports, and each input port is coupled to a different storage bank of a plurality of storage banks.

8. The flow control panel of claim 7, wherein the plurality of input ports comprises 8 input ports, and the plurality of storage banks comprises 8 storage banks.

9. The flow control panel of claim 7, wherein each input port is coupled to a respective storage bank flow controller configured to control a flow of hydrogen gas from one of the plurality of storage banks to the respective input port.

10. A flow control panel configured to control the flow of fuel from a storage bank to a dispenser, comprising:
a cold fuel controller configured to control the flow of cold fuel from a cold fuel line;
a dispenser port in fluid communication with the cold fuel controller; and
a processor, wherein the processor is configured to receive an indication of the temperature of a cooling fluid coupled to the cold fuel line and activate the cold fuel controller to allow the cold fuel from the cold fuel line to flow to the dispenser port when the indication of the temperature of the cooling fluid exceeds a threshold temperature value.

11. The flow control panel of claim 10, wherein the cold fuel line is configured to receive cold hydrogen fuel from a liquid pump.

12. The flow control panel of claim 10, wherein the temperature of hydrogen fuel flowing to the dispenser port has a temperature between −40 and −17.5° C.

13. The flow control panel of claim 10, further comprising:
an output port coupled to the storage bank;
a flow controller coupled to the output port and configured to control the flow of fuel from the storage bank to the output port; and
a junction coupled to the cold fuel controller and the output port,
wherein the processor is further configured to activate the flow controller to allow the fuel from the storage bank to flow to the junction and mix with the cold fuel from the cold fuel controller at the junction to create a fuel mixture, and to maintain the fuel mixture at a temperature that is below the maximum fuel temperature determined by the dispenser.

14. The flow control panel of claim 13, further comprising a check valve located between the cold fuel controller and the junction.

15. The flow control panel of claim 13, further comprising a check valve located between the output port and the storage bank.

16. The flow control panel of claim 13, further comprising an output connection coupled to an output of the junction, wherein the output connection is configured to couple to the dispenser.

17. The flow control panel of claim 13, wherein the output port is coupled to a plurality of input ports, and each input port is coupled to a different storage bank of a plurality of storage banks.

18. The flow control panel of claim 17, wherein the plurality of input ports comprises 8 input ports, and the plurality of storage banks comprises 8 storage banks.

19. The flow control panel of claim 17, wherein each input port is coupled to a flow controller configured to control a flow of hydrogen gas from one of the plurality of storage banks to the input port.

20. A flow control panel configured to control the flow of fuel from a storage bank to a dispenser, comprising:
a cold fuel controller configured to control the flow of cold fuel from a cold fuel line;
a dispenser port in fluid communication with the cold fuel controller;
a processor, wherein the processor is configured to receive an indication of fuel temperature within a dispenser and activate the cold fuel controller to allow the cold fuel from the cold fuel line to flow to the dispenser port when the indication of fuel temperature within the dispenser exceeds a maximum temperature determined by the dispenser;
an output port coupled to the storage bank;
a flow controller coupled to the output port and configured to control the flow of fuel from the storage bank to the output port; and
a junction coupled to the cold fuel controller and the output port,
wherein the processor is further configured to activate the flow controller to allow the fuel from the storage bank to flow to the junction and mix with the cold fuel from the cold fuel controller at the junction to create a fuel mixture, and to maintain the fuel mixture at a temperature that is below the maximum fuel temperature determined by the dispenser.

21. The flow control panel of claim 20, further comprising a check valve located between the cold fuel controller and the junction.

22. The flow control panel of claim 20, further comprising a check valve located between the output port and the storage bank.

23. The flow control panel of claim 20, wherein the dispenser port is configured to couple the flow controller to the dispenser.

24. The flow control panel of claim 20, wherein the temperature of hydrogen fuel flowing to the dispenser port has a temperature between −40 and −17.5° C.

25. The flow control panel of claim 20, wherein the output port is coupled to a plurality of input ports, and each input port is coupled to a different storage bank of a plurality of storage banks.

26. The flow control panel of claim 25, wherein the plurality of input ports comprises 8 input ports, and the plurality of storage banks comprises 8 storage banks.

27. The flow control panel of claim 25, wherein each input port is coupled to a respective storage bank flow controller configured to control a flow of hydrogen gas from one of the plurality of storage banks to the respective input port.

\* \* \* \* \*